(12) United States Patent
Karamanolis et al.

(10) Patent No.: US 11,016,820 B2
(45) Date of Patent: May 25, 2021

(54) LOAD BALANCING OF RESOURCES

(71) Applicant: VMware, Inc., Palo Alto, CA (US)

(72) Inventors: Christos Karamanolis, Los Gatos, CA (US); William Earl, Palo Alto, CA (US); Mansi Shah, Palo Alto, CA (US); Nathan Burnett, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 230 days.

(21) Appl. No.: 14/010,275

(22) Filed: Aug. 26, 2013

(65) Prior Publication Data

US 2015/0058863 A1 Feb. 26, 2015

(51) Int. Cl.
*G06F 9/50* (2006.01)

(52) U.S. Cl.
CPC .......... *G06F 9/5083* (2013.01); *G06F 9/5016* (2013.01)

(58) Field of Classification Search
None
See application file for complete search history.

(56) References Cited

U.S. PATENT DOCUMENTS

| | | | |
|---|---|---|---|
| 6,032,224 A | 2/2000 | Blumenau | |
| 6,314,526 B1 | 11/2001 | Arendt et al. | |
| 6,553,389 B1 | 4/2003 | Golding et al. | |
| 6,658,473 B1 * | 12/2003 | Block | G06F 9/5033 709/226 |
| 6,839,752 B1 | 1/2005 | Miller et al. | |
| 7,360,030 B1 | 4/2008 | Georgiev | |
| 7,669,029 B1 | 2/2010 | Mishra et al. | |
| 7,716,425 B1 | 5/2010 | Uysal et al. | |
| 8,018,892 B1 * | 9/2011 | Chen | G06F 9/455 370/310 |
| 8,074,003 B1 | 12/2011 | Salamon et al. | |
| 8,103,769 B1 | 1/2012 | Weiser et al. | |
| 8,127,059 B1 | 2/2012 | Carr et al. | |
| 8,453,036 B1 | 5/2013 | Goel et al. | |
| 8,566,520 B1 | 10/2013 | Bitner et al. | |
| 8,635,422 B1 | 1/2014 | Kaliannan et al. | |

(Continued)

FOREIGN PATENT DOCUMENTS

| | | |
|---|---|---|
| EP | 3039575 A1 | 7/2016 |
| EP | 3425883 A1 | 1/2019 |

(Continued)

OTHER PUBLICATIONS

International Search Report and Written Opinion dated Oct. 17, 2014, International Application No. PCT/US2014/041761, 10 pages.

(Continued)

*Primary Examiner* — Wynuel S Aquino
(74) *Attorney, Agent, or Firm* — Patterson + Sheridan, LLP (57) ABSTRACT

Embodiments presented herein techniques for balancing a multidimensional set of resources of different types within a distributed resources system. Each host computer providing the resources publishes a status on current resource usage by guest clients. Upon identifying a local imbalance, the host computer determines a source workload to migrate to or from the resources container to minimize the variance in resource usage. Additionally, when placing a new resource workload, the host computer selects a resources container that minimizes the variance to further balance resource usage.

20 Claims, 8 Drawing Sheets

(56) References Cited

U.S. PATENT DOCUMENTS

| | | | |
|---|---|---|---|
| 8,645,654 B1 | 2/2014 | Bailey et al. | |
| 8,682,916 B2 | 3/2014 | Wong et al. | |
| 8,782,335 B2 | 7/2014 | Pinchover et al. | |
| 8,843,925 B1 | 9/2014 | Beda, III et al. | |
| 8,898,224 B2 | 11/2014 | Haugh et al. | |
| 8,954,979 B1* | 2/2015 | Myers | G06F 9/46 718/104 |
| 8,984,243 B1 | 3/2015 | Chen et al. | |
| 9,015,123 B1 | 4/2015 | Mathew et al. | |
| 9,020,912 B1 | 4/2015 | Majee et al. | |
| 9,298,715 B2 | 3/2016 | Kumarasamy et al. | |
| 9,448,883 B1 | 9/2016 | Shrader | |
| 9,612,966 B2 | 4/2017 | Joshi et al. | |
| 10,747,475 B2 | 8/2020 | Karamanolis et al. | |
| 2001/0034733 A1 | 10/2001 | Prompt et al. | |
| 2002/0188590 A1 | 12/2002 | Curran et al. | |
| 2003/0131020 A1 | 7/2003 | Karamanolis et al. | |
| 2003/0158836 A1 | 8/2003 | Venkatesh et al. | |
| 2003/0204509 A1 | 10/2003 | Dinker et al. | |
| 2004/0054648 A1 | 3/2004 | Mogi et al. | |
| 2004/0123062 A1 | 6/2004 | Dalal et al. | |
| 2004/0136379 A1 | 7/2004 | Liao et al. | |
| 2004/0177228 A1 | 9/2004 | Leonhardt et al. | |
| 2004/0215639 A1 | 10/2004 | Bamford et al. | |
| 2005/0055603 A1 | 3/2005 | Soran et al. | |
| 2005/0097073 A1 | 5/2005 | Mair et al. | |
| 2005/0166011 A1 | 7/2005 | Burnett et al. | |
| 2005/0240714 A1 | 10/2005 | McCauley et al. | |
| 2006/0218360 A1* | 9/2006 | Burkey | H04L 67/1095 711/154 |
| 2007/0055703 A1 | 3/2007 | Zimran et al. | |
| 2008/0235448 A1 | 9/2008 | Inoue et al. | |
| 2009/0172666 A1* | 7/2009 | Yahalom | G06F 3/0605 718/1 |
| 2009/0271412 A1 | 10/2009 | Lacapra et al. | |
| 2009/0276566 A1 | 11/2009 | Coatney et al. | |
| 2010/0153617 A1 | 6/2010 | Miroshnichenko et al. | |
| 2010/0153966 A1* | 6/2010 | Arimilli | G06F 9/4856 718/105 |
| 2010/0180230 A1 | 7/2010 | Bogner et al. | |
| 2010/0235832 A1 | 9/2010 | Rajagopal et al. | |
| 2010/0299495 A1 | 11/2010 | Frank | |
| 2010/0306280 A1 | 12/2010 | Sapek | |
| 2011/0083131 A1* | 4/2011 | Pirzada | G06F 9/45533 718/1 |
| 2011/0087631 A1 | 4/2011 | Feldman et al. | |
| 2011/0238814 A1 | 9/2011 | Pitts | |
| 2011/0238857 A1 | 9/2011 | Certain et al. | |
| 2011/0265085 A1 | 10/2011 | Kedem et al. | |
| 2012/0005435 A1 | 1/2012 | Emaru et al. | |
| 2012/0016840 A1 | 1/2012 | Lin et al. | |
| 2012/0137066 A1 | 5/2012 | Nolterieke et al. | |
| 2012/0204176 A1* | 8/2012 | Tian | G06F 9/505 718/1 |
| 2012/0210068 A1 | 8/2012 | Joshi et al. | |
| 2012/0239896 A1 | 9/2012 | Sobel | |
| 2012/0272241 A1 | 10/2012 | Nonaka et al. | |
| 2012/0303322 A1 | 11/2012 | Rego et al. | |
| 2013/0007436 A1 | 1/2013 | Bookman et al. | |
| 2013/0124798 A1 | 5/2013 | Aszmann et al. | |
| 2013/0185413 A1* | 7/2013 | Beaty | G06F 9/5072 709/224 |
| 2013/0204849 A1 | 8/2013 | Chacko | |
| 2013/0311989 A1 | 11/2013 | Ota et al. | |
| 2014/0013055 A1 | 1/2014 | Frey et al. | |
| 2014/0115579 A1 | 4/2014 | Kong | |
| 2014/0123062 A1 | 5/2014 | Nguyen | |
| 2014/0130055 A1 | 5/2014 | Guha | |
| 2014/0156925 A1 | 6/2014 | Baron et al. | |
| 2014/0173226 A1 | 6/2014 | Gold | |
| 2014/0173612 A1* | 6/2014 | Haydock | G06F 9/50 718/104 |
| 2014/0195847 A1 | 7/2014 | Webman et al. | |
| 2014/0201152 A1 | 7/2014 | Kumarasamy et al. | |
| 2014/0201736 A1 | 7/2014 | Mizrahi et al. | |
| 2014/0359556 A1* | 12/2014 | Jujare | G06F 8/20 717/104 |
| 2015/0039763 A1* | 2/2015 | Chaudhary | H04L 67/1008 709/226 |
| 2015/0058298 A1 | 2/2015 | Earl et al. | |
| 2015/0058384 A1 | 2/2015 | Karamanolis et al. | |
| 2015/0058475 A1 | 2/2015 | Earl et al. | |
| 2015/0058555 A1 | 2/2015 | Karamanolis et al. | |
| 2015/0058577 A1 | 2/2015 | Earl | |
| 2016/0004616 A1 | 1/2016 | Narita et al. | |
| 2017/0317947 A9 | 11/2017 | Karamanolis et al. | |
| 2018/0095991 A1 | 4/2018 | Karamanolis et al. | |
| 2018/0176142 A1 | 6/2018 | Earl et al. | |
| 2020/0174974 A1 | 6/2020 | Karamanolis et al. | |

FOREIGN PATENT DOCUMENTS

| | | |
|---|---|---|
| JP | H06110766 A | 4/1994 |
| JP | 10049423 A | 2/1998 |
| JP | 2002108567 A | 4/2002 |
| JP | 2002-229837 A | 8/2002 |
| JP | 2005510794 A | 4/2005 |
| JP | 2006-107501 A | 4/2006 |
| JP | 2007-501455 A | 1/2007 |
| JP | 2007272874 A | 10/2007 |
| JP | 2008527555 A | 7/2008 |
| JP | 2008-192139 A | 8/2008 |
| JP | 2008-210057 A | 9/2008 |
| JP | 2008-541207 A | 11/2008 |
| JP | 2009217475 A | 9/2009 |
| JP | 2010055369 A | 3/2010 |
| JP | 2010066842 A | 3/2010 |
| JP | 2010-186472 A | 8/2010 |
| JP | 2012008854 A | 1/2012 |
| JP | 2012-507075 A | 3/2012 |
| JP | 2012-104097 A | 5/2012 |
| JP | 2012-173996 A | 9/2012 |
| WO | 2006077215 A | 7/2006 |
| WO | 2008109321 A1 | 9/2008 |
| WO | 2010048048 A2 | 4/2010 |
| WO | 2011108027 A1 | 9/2011 |
| WO | 2012024801 A1 | 3/2012 |
| WO | 2012090247 A1 | 7/2012 |
| WO | 2012104912 A1 | 8/2012 |
| WO | 2015030901 A1 | 3/2015 |

OTHER PUBLICATIONS

International Search Report and Written Opinion dated Sep. 5, 2014, International Application No. PCT/US2014/041757, 8 pages.

International Search Report and Written Opinion dated Sep. 1, 2014, International Application No. PCT/US2014/041764, 11 pages.

International Search Report and Written Opinion dated Oct. 1, 2014, International Application No. PCT/US2014/041164, 9 pages.

International Search Report and Written Opinion dated Dec. 8, 2014, International Application No. PCT/US2014/041172, 15 pages.

Adam et al., "Regeneration with Virtual Copies for Replicated Databases," [Proceedings of the International Conference on Distributed Computing Systems], Los Alamitos, IEEE Comp. Soc. Press, US. vol. Conf. 11, May 20, 1991, p. 429-436.

Hu et al., "Performance Evaluation of Dynamic Supporting Algorithms," Proceedings of the Annual International Computer Software and Applications Conference (COMPSAC), Los Alamitos, IEEE Comp., vol. Conf. 16, Sep. 21, 1992, pp. 90-95.

Non-final Rejection dated Sep. 16, 2015, U.S. Appl. No. 14/010,316, 40 pages.

Office Action dated Apr. 28, 2016 in related U.S. Appl. No. 14/010,291.

Jacek Migdal. 2011. Data Block Encoding of KeyValues (aka delta encoding I prefix compression). The Apache Software Foundation HBase. https://issues.apache.org/jira/browse/HBASE-4218.

Jonathan Gray. 2009. Concurrent LRU Block Cache. The Apache Software Foundation HBase. https:Mssues.apache.org/jira/browse/HBASE-1460.

(56) References Cited

OTHER PUBLICATIONS

Bishwaranjan Bhattacharjee, Lipyeow Lim, Timothy Malkemus, George Mihaila, Kenneth Ross, Sherman Lau, Cathy McArthur, Zoltan Toth, and Reza Sherkat. 2009. Efficient index compression in DB2 LUW. Proc. VLDB Endow. 2, 2 (Aug. 2009), 1462-1473. DOI=10.14778/1687553.1687573 http://dx.doi.org/1 0.14 778/1687553.1687573.

Direct Attached Storage. Article [online]. Apex Microsystems, 2009 [retrieved on May 4, 2016]. Retrieved from the Internet <http://www.apexmicrosystem.com/?page_id+518>.

"Virtual Drive", Web Page ,http://searchservervirtualization.techtarget.com/definition/virtual-drive>, Jun. 14, 2012, retrived from Internet Archive Wayback Machine, https://web.archive.org/web/20120614001609/http://searchservervirtualization.techtarget.com/definition/virtual-drive> on Feb. 3, 2016.

Final Office Action dated Feb. 12, 2016 in related U.S. Appl. No. 14/010,316.

Austrailian Search Report dated Jan. 16, 2017 in related Australian Patent Application 2014311869.

Japanese Office Action dated Feb. 21, 2017 in related Japanese Patent Application 2016-529769, 7 pages.

Japanese Office Action dated Jan. 10, 2017 in related Japanese Patent Application 2016-531609, 7 pages.

Vocabulary.com Article [online]. Vocabulary.com, Sep. 10, 2012 [retrieved on Aug. 30, 2016]. Retrieved from the Internet <https://web.archive.org/web/20120910033525/http://www.vocabulary.com/dictionary/incorporated>.

Australian Search Report dated Sep. 1, 2016 in related Australian Patent Application 2014311781.

Final Office Action dated Jul. 12, 2017 in related U.S. Appl. No. 14/010,316.

Japanese Office Action dated Nov. 21, 2017, filed in Japanese counterpart Application No. 2016-529768, 6 pages (with concise statement).

Japanese Office Action dated Jan. 30, 2018, filed in Japanese counterpart Application No. 2017-196048, 10 pages (with English Translation).

Japanese Office Action dated Jun. 27, 2017 in related Japanese Patent Application 2016-529768, 7 pages.

Examination Report dated Nov. 26, 2018 for Australian Application No. 2017225042.

Japanese Office Action issued to 2017-196048 dated Jul. 3, 2018.

Dissecting the new function of Windows Server 2003 "Virtual Disk Service", Windows Pro, Book, Nikkei BP, Oct. 1, 2003, 79, pp. 122-127.

Shinji Shiota, Integrated Operating Environment on Windows New-Wave 3.0, ASCII, Book, ASCII Corporation, Dec. 1, 1992, vol. 16, No. 12, pp. 329-332.

Office Action dated Oct. 16, 2018 for Japanese Patent Application No. 2017-208059.

European Search Report issued to Application No. 18190819.5 dated Oct. 16, 2018.

\* cited by examiner

LOAD BALANCING OF RESOURCES

CROSS-REFERENCE TO RELATED APPLICATIONS

This application is related to the following commonly assigned, co-pending applications: "Distributed Policy-Based Provisioning and Enforcement for Quality of Service" (Ser. No. 14/010,247), "Scalable Distributed Storage Architecture" (Ser. No. 14/010,293), and "Virtual Disk Blueprints for a Virtualized Storage Area Network" (Ser. No. 14/010,316), each of which was filed on Aug. 26, 2013. Each related application is incorporated by reference herein in its entirety.

BACKGROUND

Distributed systems allow multiple clients in a network to access a pool of shared resources. For example, a distributed storage system allows a cluster of host computers to aggregate local disks (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines spawned on the host computers may use the datastore, for example, to store virtual disks that are accessed by the virtual machines during their operation. Because the shared local disks that make up the datastore may have different performance characteristics (e.g., capacity, input/output operations per second or IOPS capabilities, etc.), usage of such shared local disks to store virtual disks or portions thereof may be distributed among the virtual machines based on the needs of each given virtual machine.

This approach provides enterprises with cost-effective performance. For instance, distributed storage using pooled local disks is inexpensive, highly scalable, and relatively simple to manage. Because such distributed storage can use commodity disks in the cluster, enterprises do not need to invest in additional storage infrastructure. However, one issue with this approach is resource usage variance. That is, high variance between resource types results in inefficient usage overall. Continuing the distributed storage system example, when the system creates a virtual machine, the system may provision a set of resources (e.g., capacity, performance, availability, etc.) to the new virtual machine based on requirements of the virtual machine. If a particular partition of the shared datastore has high consumption of one or more types of resource, such as operations, and a much lower consumption in another, such as capacity, then the system may be unable to assign that partition to the virtual machine despite the available capacity. It is also a problem when consumption of one resource type is high for a particular partition in the datastore but consumption is low throughout the rest of the datastore because it is an inefficient distribution of resources.

SUMMARY

One or more embodiments disclosed herein provide a method for distributing a storage object having a workload to a multidimensional set of distributed resources having a plurality of resource types in a distributed resources system. The method generally includes retrieving a status of resource usage of each of the plurality of resource types in resource containers published by each node of the distributed resources system. The method also generally includes identifying one or more candidate resource containers within each node based on the statuses. Each candidate resource container has an original variance among the resource usage of the plurality of resource types. The method also generally includes determining an expected variance among the resource usage of the plurality of resource types for each candidate resource container. The method also generally includes placing the set of distributed resources in one of at least one candidate resource container with the expected variance being lower than the original variance.

Another embodiment disclosed herein provides a method for rebalancing a multidimensional set of distributed resources having a plurality of resource types in a distributed resources system. The method generally includes retrieving a status of resource usage of each of the plurality of resource types in resource containers published by each node of the distributed resources system. The method also generally includes identifying a source object component causing an imbalance of the resource usage in a first one of the resource containers. The method also generally includes identifying one or more candidate resource containers within each node based on the statuses. Each candidate resource container has an original variance among resource usage of the plurality of resource types. The method also generally includes determining an expected variance among the resource usage of the plurality of resource types for each candidate resource container. The method also generally includes relocating the source object component to one of the one or more of the candidate resource containers that reduces the original variance based on the expected variance.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DETAILED DESCRIPTION

Embodiments disclosed herein provide techniques for balancing the usage variance of a multidimensional set of distributed resources across and within the individual host computers providing resources in a networked cluster. The techniques disclosed herein allow for relatively balanced resource usage and sufficient headroom in resources for thin-provisioning. In one embodiment, balancing (or rebalancing) occurs in assigning a new workload to distributed resources or in adjusting an existing usage variance imbalance in each individual node of the system. Each node publishes aggregate resource usage data by resource type for each resource container. Using the published data across the cluster, each node identifies candidate resource containers to place or migrate a workflow. For each candidate, the node determines an expected variance. Based on the expected variances, the host node selects a randomized placement (or migration) having a minus variance that results in an approximate balance in resource usage.

For instance, the techniques described herein may apply to a distributed storage system. One example of an applicable distributed storage system is a software-based "virtual storage area network" (VSAN) where host servers in a cluster each act as a node that contributes its commodity local storage resources (e.g., hard disk and/or solid state drives, etc.) to provide an aggregate "object" store. Each host server may include a storage management module (also referred to herein as a VSAN module) in order to automate storage management workflows (e.g., create objects in the object store, etc.) and provide access to objects in the object store (e.g., handle I/O operations to objects in the object store, etc.) based on predefined storage policies specified for objects in the object store. In one particular embodiment, the host servers further support the instantiation of virtual machines (VMs) which act as clients to the VSAN object store. In such an embodiment, the "objects" stored in the object store may include, for example, file system objects that may contain VM configuration files and virtual disk descriptor files, virtual disk objects that are accessed by the VMs during runtime and the like. The VSAN module in each node aims to balance resource usage in local disk groups between resource types, such as solid state drive IOPS and capacity as well as magnetic disk IOPS and capacity. In a software-based VSAN, balancing resource usage variance in each individual host server ensures that virtual machines across the virtualization cluster consume storage resources efficiently and are able to access resource types when available. Further, the distributed approach of individual host nodes monitoring resource consumption and readjusting the resource workloads eliminates the need for a centralized approach (e.g., through a management application or server) to balance the resources across the cluster.

Reference is now made in detail to several embodiments, examples of which are illustrated in the accompanying figures. Note, that wherever practicable, similar or like reference numbers may be used in the figures and may indicate similar or like functionality. The figures depict embodiments for purposes of illustration only. One having skill in the art will readily recognize from the following description that alternative embodiments of the structures and methods illustrated herein may be employed without departing from the principles described herein.

In the following, a VSAN module provides as a reference example of a system that load balances multiple resource types in a distributed resources system. This reference example is included to provide an understanding of the embodiments described herein. However, it will be apparent to one of skill in the art that these embodiments are applicable in other contexts related load balancing shared resources, regardless of the type of computing environment. For example, the embodiments may be applicable to software defined computers, networks, and storage arrays. Further, the embodiments are applicable to balancing other shared computing resources (e.g., processing, memory, and network resources, etc.).

Similarly, numerous specific details are provided to provide a thorough understanding of the embodiments. One of skill in the art will recognize that the embodiments may be practiced without some of these specific details. In other instances, well known process operations and implementation details have not been described in detail to avoid unnecessary obscuring of novel aspects of the disclosure.

Figure 1:
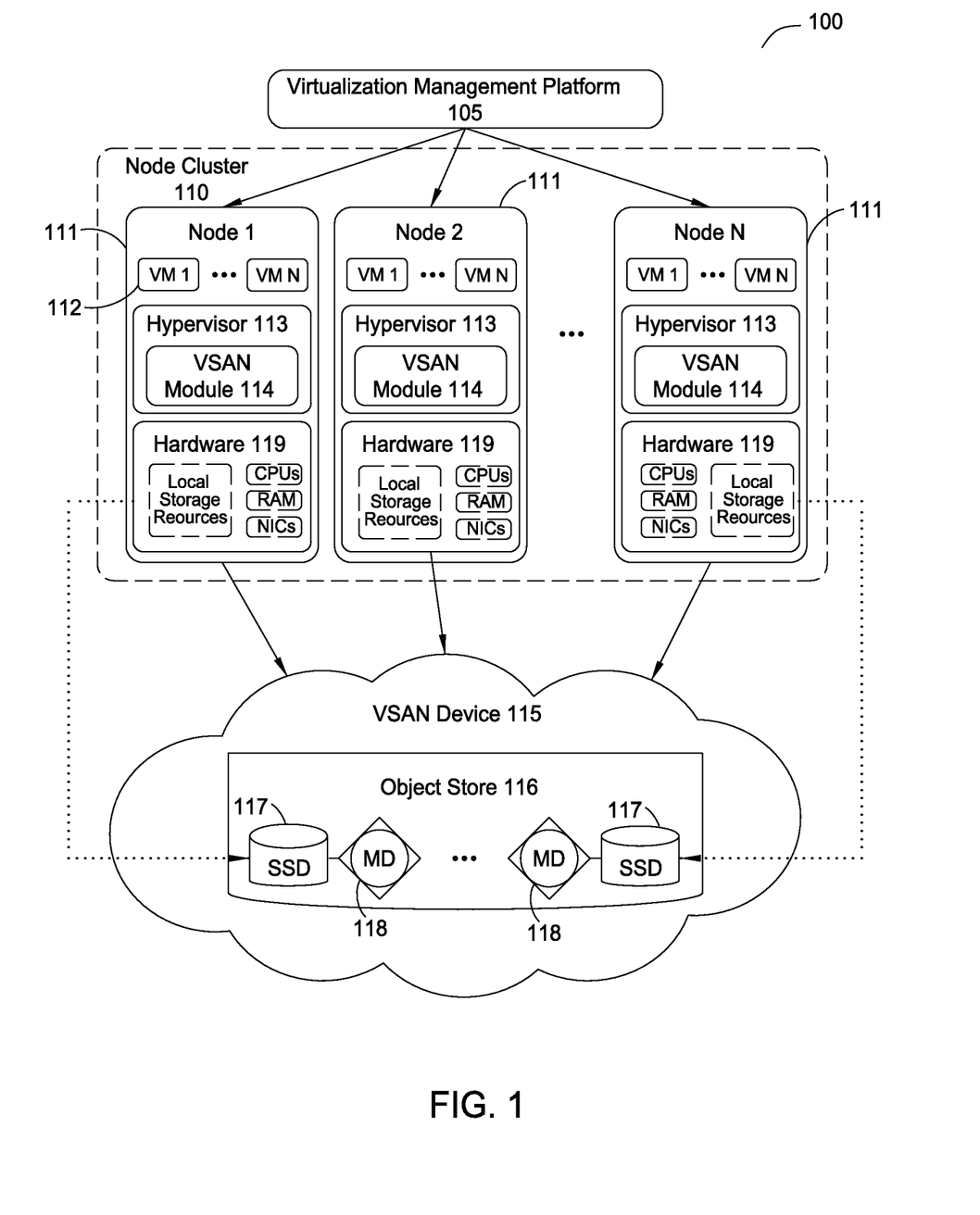
FIG. 1 illustrates an example computing environment, according to one embodiment.

FIG. 1 illustrates a computing environment 100, according to one embodiment. As shown, computing environment 100 is a VSAN environment that leverages the commodity local storage housed in or directly attached (hereinafter, use of the term "housed" or "housed in" may be used to encompass both housed in or otherwise directly attached) to host servers or nodes 111 of a cluster 110 to provide an aggregate object store 116 to virtual machines (VMs) 112 running on the nodes. The local commodity storage housed in or otherwise directly attached to the nodes 111 may include combinations of solid state drives (SSDs) 117 and/or magnetic or spinning disks 118. In certain embodiments, SSDs 117 serve as a read cache and/or write buffer in front of magnetic disks 118 to increase I/O performance.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a VSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described further below, each hypervisor 113, through its corresponding VSAN module 114, provides access to storage resources located in hardware 119 (e.g., SSDs 117 and magnetic disks 118) for use as storage for virtual disks (or portions thereof) and other related files that may be accessed by any VM 112 residing in any of nodes 111 in cluster 110. In a particular embodiment, vSphere Hypervisor from VMware, Inc. (VMware) may be installed on nodes 111 as hypervisor 113 and vCenter Server from VMware may be used as virtualization management platform 105.

In one embodiment, VSAN module 114 is implemented as a "VSAN" device driver within hypervisor 113. In such an embodiment, VSAN module 114 provides access to a conceptual "VSAN" 115 through which an administrator can create a number of top-level "device" or namespace objects that are backed by object store 116. In one common scenario, during creation of a device object, the administrator may specify a particular file system for the device object (such device objects hereinafter also thus referred to "file system objects"). For example, in one embodiment, each hypervisor 113 in each node 111 may, during a boot process, discover a /vsan/ root node for a conceptual global namespace that is exposed by VSAN module 114. By, for example, accessing APIs exposed by VSAN module 114, hypervisor 113 can then determine all the top-level file system objects (or other types of top-level device objects) currently residing in VSAN 115. When a VM (or other client) attempts to access one of the file system objects, hypervisor 113 may dynamically "auto-mount" the file system object at that time. A file system object (e.g., /vsan/fs_name1, etc.) that is accessible through VSAN 115 may, for example, be implemented to emulate the semantics of a particular file system such as VMware's distributed or clustered file system, VMFS, which is designed to provide concurrency control among simultaneously accessing VMs. Because VSAN 115 supports multiple file system objects, it is able provide storage resources through object store 116 without being confined by limitations of any particular clustered file system. For example, many clustered file systems (e.g., VMFS, etc.) can only scale to support a certain amount of nodes 111. By providing multiple top-level file system object support, VSAN 115 overcomes the scalability limitations of such clustered file systems.

As described in further detail in the context of FIG. 2 below, a file system object, may, itself, provide access to a number of virtual disk descriptor files (e.g., .vmdk files in a vSphere environment, etc.) accessible by VMs 112 running in cluster 110. These virtual disk descriptor files contain references to virtual disk "objects" that contain the actual data for the virtual disk and are separately backed by object store 116. A virtual disk object may itself be a hierarchical or "composite" object that, as described further below, is further composed of "component" objects (again separately backed by object store 116) that reflect the storage requirements (e.g., capacity, availability, IOPs, etc.) of a corresponding storage profile or policy generated by the administrator when initially creating the virtual disk. As further discussed below, each VSAN module 114 (through a cluster level object management or "CLOM" sub-module, in embodiments as further described below) communicates with other VSAN modules 114 of other nodes 111 to create and maintain an in-memory metadata database (e.g., maintained separately but in synchronized fashion in the memory of each node 111) that contains metadata describing the locations, configurations, policies and relationships among the various objects stored in object store 116. This in-memory metadata database is utilized by a VSAN module 114 on a node 111, for example, when an administrator first creates a virtual disk for a VM as well as when the VM is running and performing I/O operations (e.g., read or write) on the virtual disk. As further discussed below in the context of FIG. 3, VSAN module 114 (through a document object manager or "DOM" sub-module, in one embodiment as further described below) traverses a hierarchy of objects using the metadata in the in-memory database in order to properly route an I/O operation request to the node (or nodes) that houses (house) the actual physical local storage that backs the portion of the virtual disk that is subject to the I/O operation.

Figure 2:
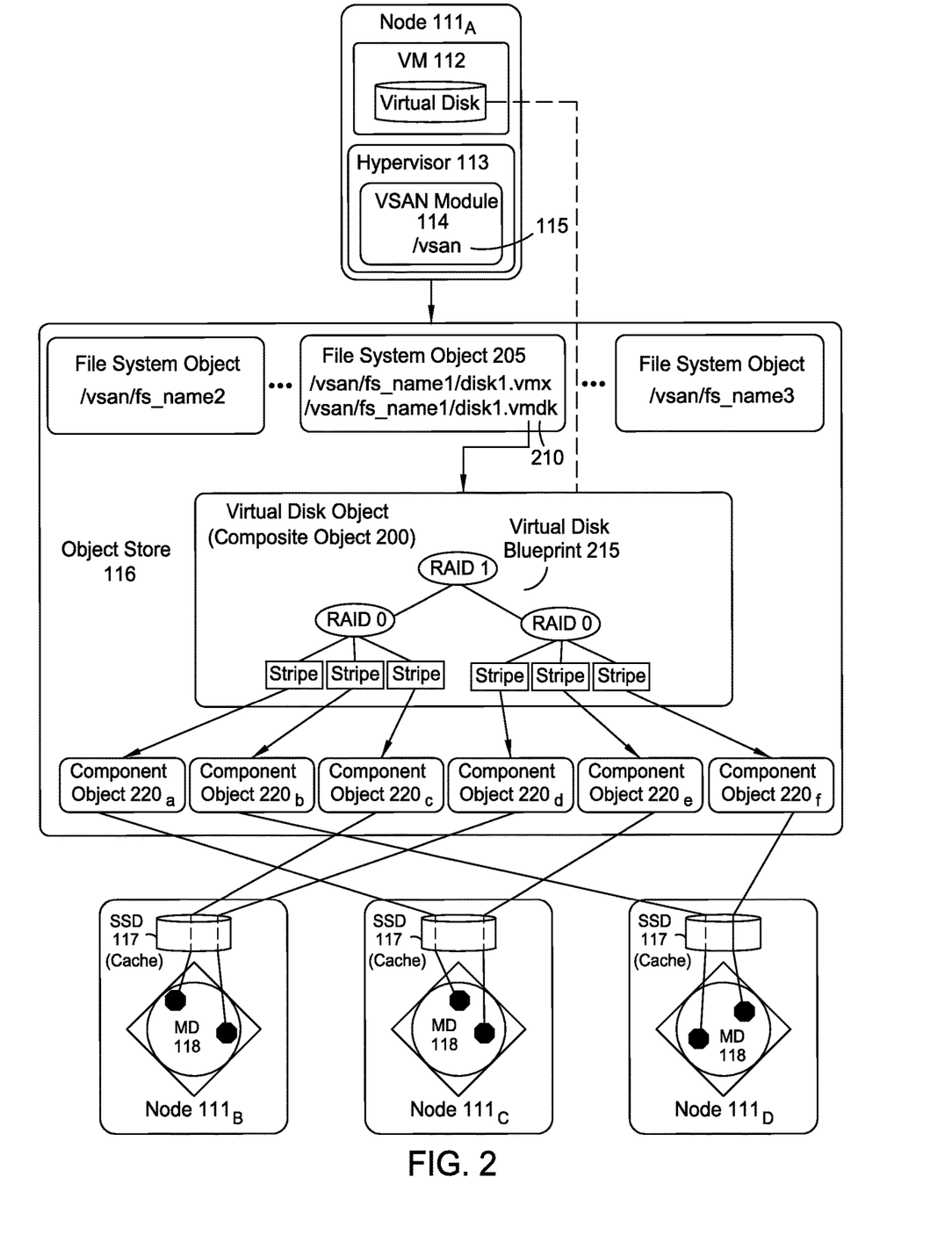
FIG. 2 illustrates an example hierarchical structure of objects organized within an object store that represent a virtual disk, according to one embodiment.

FIG. 2 illustrates an example hierarchical structure of objects organized within object store 116 that represent a virtual disk, according to one embodiment. As previously discussed above, a VM 112 running on one of nodes 111 may perform I/O operations on a virtual disk that is stored as a hierarchical or composite object 200 in object store 116. Hypervisor 113 provides VM 112 access to the virtual disk by interfacing with the abstraction of VSAN 115 through VSAN module 114 (e.g., by auto-mounting the top-level file system object corresponding to the virtual disk object, as previously discussed, in one embodiment). For example, VSAN module 114, by querying its local copy of the in-memory metadata database, is able to identify a particular file system object 205 (e.g., a VMFS file system object in one embodiment, etc.) stored in VSAN 115 that stores a descriptor file 210 for the virtual disk (e.g., a .vmdk file, etc.). It should be recognized that the file system object 205 may store a variety of other files consistent with its purpose, such as virtual machine configuration files (e.g., .vmx files in a vSphere environment, etc.) and the like when supporting a virtualization environment. In certain embodiments, each file system object may be configured to support only those virtual disks corresponding to a particular VM (e.g., a "per-VM" file system object).

Descriptor file 210 includes a reference to composite object 200 that is separately stored in object store 116 and conceptually represents the virtual disk (and thus may also be sometimes referenced herein as a virtual disk object). Composite object 200 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by an administrator when creating the virtual disk. For example, in the embodiment of FIG. 2, composite object 200 includes a virtual disk blueprint 215 that describes a RAID 1 configuration where two mirrored copies of the virtual disk (e.g., mirrors) are each further striped in a RAID 0 configuration. Composite object 225 may thus contain references to a number of "leaf" or "component" objects $220_x$ corresponding to each stripe (e.g., data partition of the virtual disk) in each of the virtual disk mirrors. The metadata accessible by VSAN module 114 in the in-memory metadata database for each component object 220 (e.g., for each stripe) provides a mapping to or otherwise identifies a particular node $111_x$ in cluster 110 that houses the physical storage resources (e.g., magnetic disks 118, etc.) that actually store the stripe (as well as the location of the stripe within such physical resource).

Figure 3:
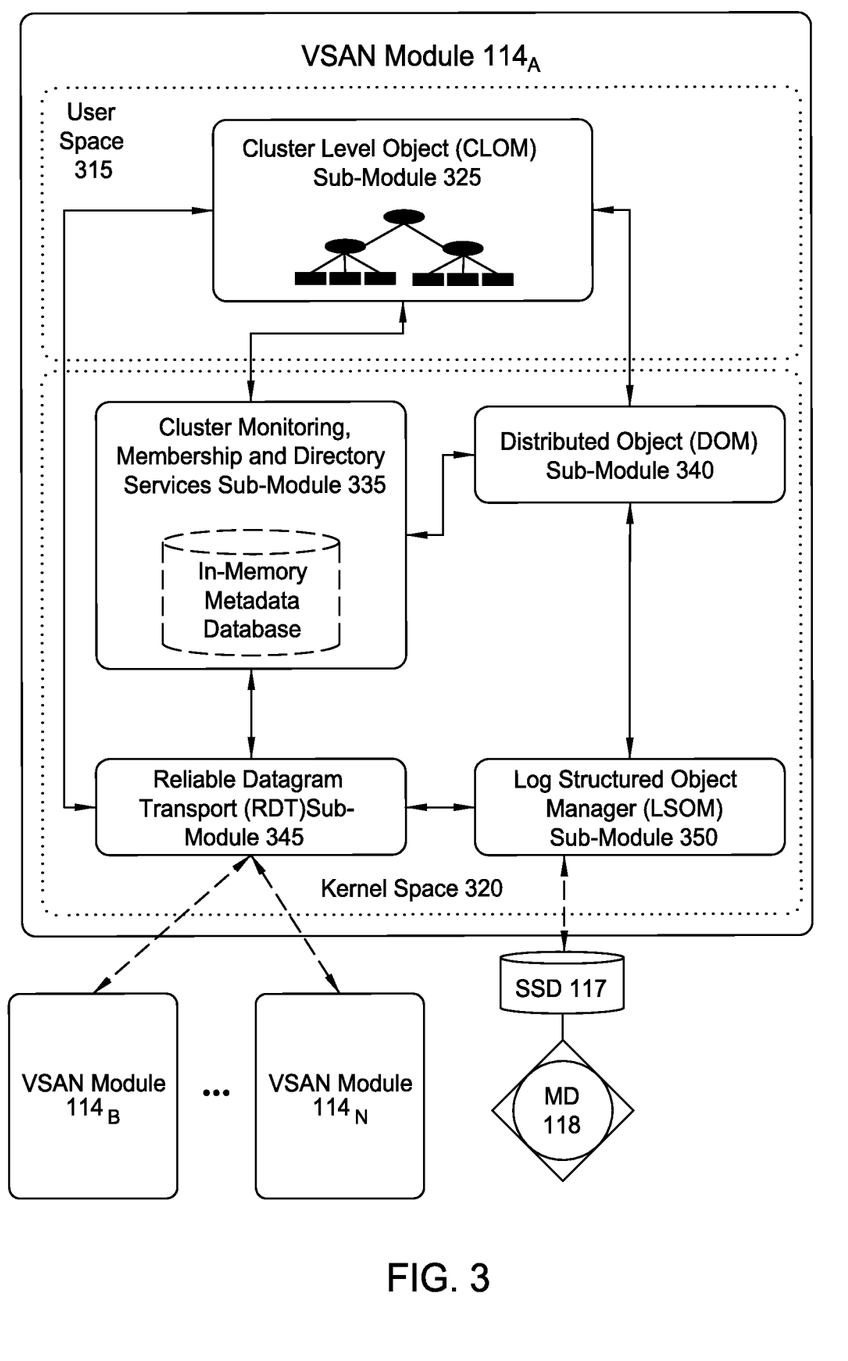
FIG. 3 illustrates an example abstraction of the virtual storage area network object layout, according to one embodiment.

FIG. 3 illustrates components of a VSAN module 114, according to one embodiment. As previously described, in certain embodiments, VSAN module 114 may execute as a device driver exposing an abstraction of a VSAN 115 to hypervisor 113. Various sub-modules of VSAN module 114 handle different responsibilities and may operate within either user space 315 or kernel space 320 depending on such responsibilities. As depicted in the embodiment of FIG. 3, VSAN module 114 includes a cluster level object management (CLOM) sub-module 325 that operates in user space 315. CLOM sub-module 325 generates virtual disk blueprints during creation of a virtual disk by an administrator and ensures that objects created for such virtual disk blueprints are configured to meet storage profile or policy requirements set by the administrator. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by an administrator to the storage profile or policy relating to an object or when changes to the cluster or workload result in an object being out of compliance with a current storage profile or policy.

In one embodiment, if an administrator creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/stripes of the virtual disk to achieve load balancing, etc.).

For example, CLOM sub-module 325, in one embodiment, is responsible for generating blueprint 215 describing the RAID 1/RAID 0 configuration for virtual disk object 200 in FIG. 2 when the virtual disk was first created by the administrator. As previously discussed, a storage policy may specify requirements for capacity, IOPS, availability, and reliability. Storage policies may also specify a workload characterization (e.g., random or sequential access, I/O request size, cache size, expected cache hit ration, etc.). Additionally, the administrator may also specify an affinity to VSAN module 114 to preferentially use certain nodes 111 (or the local disks housed therein). For example, when provisioning a new virtual disk for a VM, an administrator may generate a storage policy or profile for the virtual disk specifying that the virtual disk have a reserve capacity of 400 GB, a reservation of 150 read IOPS, a reservation of 300 write IOPS, and a desired availability of 99.99%. Upon receipt of the generated storage policy, CLOM sub-module 325 consults the in-memory metadata database maintained by its VSAN module 114 to determine the current state of cluster 110 in order generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340 which interacts with object space 116 to implement the blueprint by, for example, allocating or otherwise mapping component objects (e.g., stripes) of the composite object to physical storage locations within various nodes 111 of cluster 110.

In addition to CLOM sub-module 325 and DOM sub-module 340, as further depicted in FIG. 3, VSAN module 114 may also include a cluster monitoring, membership, and directory services (CMMDS) sub-module 335 that maintains the previously discussed in-memory metadata database to provide information on the state of cluster 110 to other sub-modules of VSAN module 114 and also tracks the general "health" of cluster 110 by monitoring the status, accessibility, and visibility of each node 111 in cluster 110. The in-memory metadata database serves as a directory service that maintains a physical inventory of the VSAN environment, such as the various nodes 111, the storage resources in the nodes 111 (SSD, magnetic disks, etc.) housed therein and the characteristics/capabilities thereof, the current state of the nodes 111 and there corresponding storage resources, network paths among the nodes 111, and the like. As previously discussed, in addition to maintaining a physical inventory, the in-memory metadata database further provides a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within VSAN module 114 may access CMMDS sub-module 335 (represented by the connecting lines in FIG. 3) for updates to learn of changes in cluster topology and object configurations. For example, as previously discussed, during virtual disk creation, CLOM sub-module 325 accesses the in-memory metadata database to generate a virtual disk blueprint, and in order to handle an I/O operation from a running VM 112, DOM sub-module 340 accesses the in-memory metadata database to determine the nodes 111 that store the component objects (e.g., stripes) of a corresponding composite object (e.g., virtual disk object) and the paths by which those nodes are reachable in order to satisfy the I/O operation.

As previously discussed, DOM sub-module 340, during the handling of I/O operations as well as during object creation, controls access to and handles operations on those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network with a different DOM sub-module 340 in a second node 111 (or nodes) that serves as the coordinator for the particular component object (e.g., stripe, etc.) of the virtual disk object that is stored in the local storage of the second node 111 and which is the portion of the virtual disk that is subject to the I/O operation. If the VM issuing the I/O operation resides on a node 111 that is also different from the coordinator of the virtual disk object, the DOM sub-module 340 of the node running the VM would also have to communicate across the network with the DOM sub-module 340 of the coordinator. In certain embodiments, if the VM issuing the I/O operation resides on node that is different from the coordinator of the virtual disk object subject to the I/O operation, the two DOM sub-modules 340 of the two nodes may to communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 also similarly communicate amongst one another during object creation. For example, a virtual disk blueprint generated by CLOM module 325 during creation of a virtual disk may include information that designates which nodes 111 should serve as the coordinators for the virtual disk object as well as its corresponding component objects (stripes, etc.). Each of the DOM sub-modules 340 for such designated nodes is issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 interacts with a log structured object manager (LSOM) sub-module 350 that serves as the component in VSAN module 114 that actually drives communication with the local SSDs and magnetic disks of its node 111. In addition to allocating local storage for component objects (as well as to store other metadata such a policies and configurations for composite objects for which its node serves as coordinator, etc.), LSOM sub-module 350 additionally monitors the flow of I/O operations to the local storage of its node 111.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In one embodiment, the underlying transport is TCP. Alternatively, other transports such as RDMA may be used. RDT sub-module 345 is used, for example, when DOM sub-modules 340 communicate with one another, as previously discussed above to create objects or to handle I/O operations. In certain embodiments, RDT module 345 interacts with CMMDS module 335 to resolve the address of logical endpoints dynamically in order to maintain up-to-date location information in the in-memory metadata database as well as to create, remove, or reestablish connections based on link health status. For example, if CMMDS module 335 reports a link as unhealthy, RDT sub-module 345 may drop the connection in favor of a link in better condition.

Figure 4:
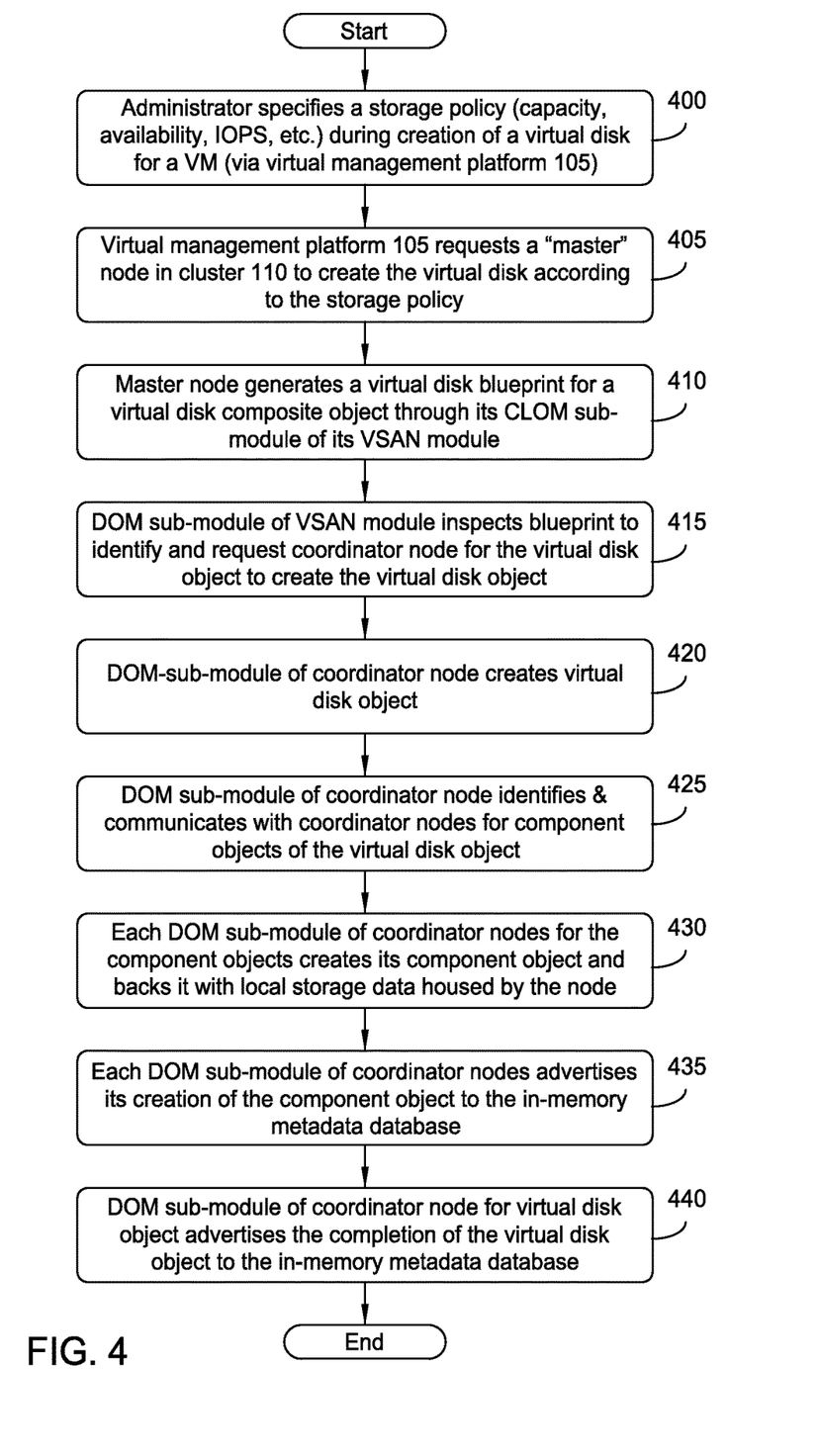
FIG. 4 illustrates a VSAN module, according to one embodiment.

FIG. 4 illustrates a method flow diagram for creating a virtual disk object based on a defined storage policy, according to one embodiment. For example, in step 400, an administrator may interact with a user interface of virtual management platform 105 to create a virtual disk having capacity, availability and IOPS requirements (e.g., the defined storage policy). In one embodiment, virtual management platform 105 may then request a "master" node 111 to create an object for the virtual disk in step 405. In step 410, such a master node 111 may generate a virtual disk blueprint through its CLOM sub-module 325 in VSAN module. As previously discussed, CLOM sub-module 35 generates a virtual disk blueprint for the creation of a virtual disk object (e.g., a composite object) based on the status of cluster 110 as determined by consulting the in-memory metadata database of CMMS sub-module 335. The virtual disk blueprint may identify a particular node that should serve as the coordinator or owner of the virtual disk object. In step 415, the DOM sub-module 340 of the master node 111 may the request the DOM sub-module 340 of the identified node to create the virtual disk object. In step 420, the DOM sub-module 340 of the identified node receives the request and creates the virtual disk object, by, for example, communicating with its corresponding the LSOM sub-module 350 to persistently store metadata describing the virtual disk object in its local storage. In step 425, the DOM sub-module 340, based on the virtual disk object blueprint, identifies those others nodes in cluster 110 that have been designated to serve as the coordinator or owner for any component objects in the virtual disk blueprint. The DOM sub-module 340 communicates (e.g., using its RTP sub-module 345) with the DOM sub-modules 340 of the other nodes that will serve as coordinators for the component objects and store the data backing such component objects in their local storage. When such DOM sub-modules 340 receive a request from the DOM sub-module 340 of the coordinator of the virtual disk object to create their respective component objects, they, in turn in step 430, communicate with their respective LSOM modules 350 to allocate local storage for the component object (and its related metadata). Once such component objects have been created, their DOM sub-modules 340 advertise the creation of the components to the in-memory metadata database of its CMMS sub-module 335 in step 435. In step 440, in turn, the DOM sub-module 340 for the coordinator of the virtual disk object also advertises its creation to its CMMDS sub-module 335 to update the in-memory metadata database and ultimately transmits an acknowledgement to the administrator (e.g., via the master node communications back to virtual management platform 105).

Figure 5:
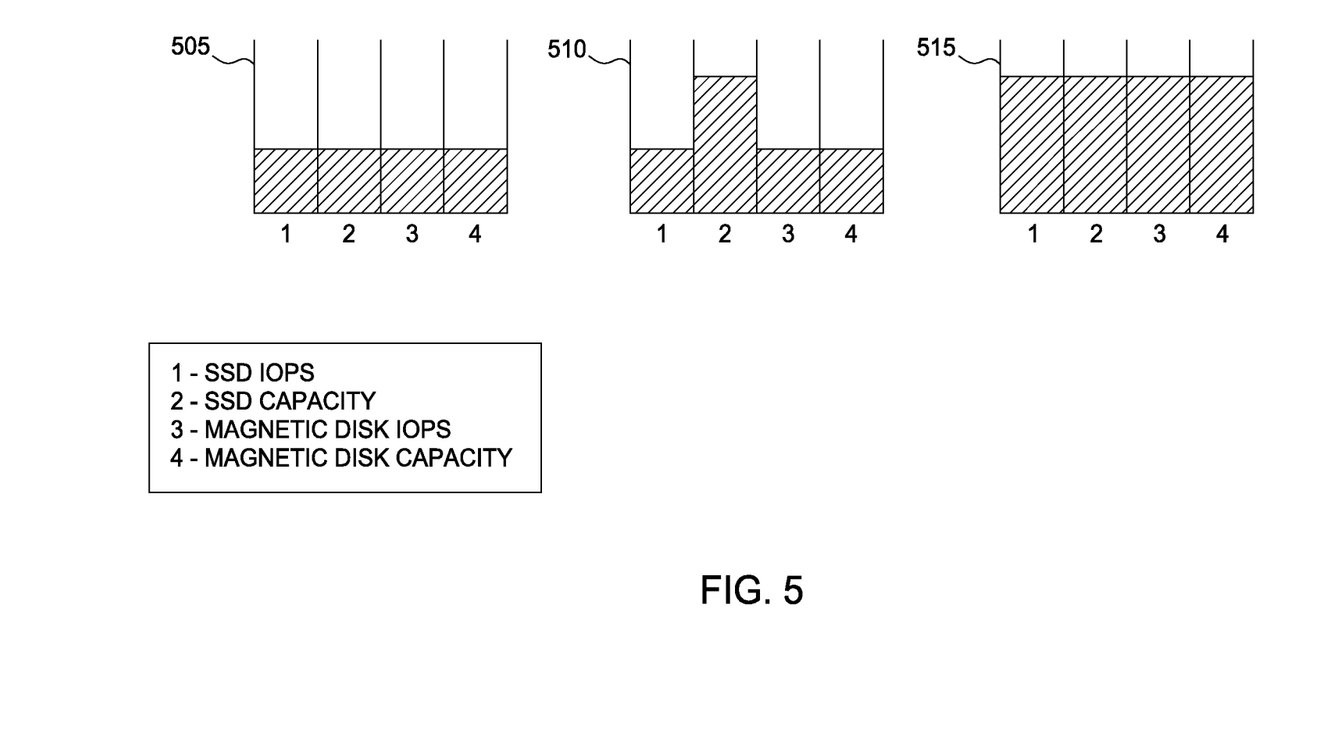
FIG. 5 illustrates three example disk groups with varying resource usages, according to one embodiment.

FIG. 5 illustrates three example disk groups with varying resource component workloads, according to one embodiment. In the VSAN environment, over time, the VSAN module adds new components having associated workloads to disk groups and migrates other components across other disk groups based on object policies. At other times, storage clients, such as virtual machines, reserve fewer resources, resulting in deletions from the disk group. Although VSAN module 114 aims to balance resource usage workloads in each disk group at each placement and migration, such changes to the disk groups sometimes creates resource usage variance. A disk group can include multiple dimensions based on the number of disks in the disk group. For simplicity, the disk groups depicted have four dimensions: SSD IOPS, SSD capacity, magnetic disk IOPS, and magnetic disk capacity. In practice, disk groups may include more disks than depicted.

FIG. 5 depicts disk groups 505, 510, and 515 as each having resource usages of varying consumption. The usages depicted in the figure correspond to usage by a virtual machine in the cluster. Disk group 505 represents a low and relatively even usage across SSD operations, SSD capacity, magnetic disk operations, and magnetic disk capacity. Disk group 515 depicts a high and relatively even usage across the same resource types. The cases highlighted in disk groups 505 and 515 are desirable because the variance in consumption across resource types is low. That is, for disk group 505, the resource usage across the resource types is low and relatively balanced. This configuration allows VSAN module 114 to place successive workloads to disk group 505. Further, although the resource usage in disk group 515 is high, the resources are being consumed efficiently.

However, the resource consumption variance shown in disk group 510 is not a desirable case. Disk group 510 depicts an uneven variance with high consumption in SSD capacity. In this case, although disk group 510 has a considerable amount of SSD IOPS, magnetic disk IOPS, and magnetic disk capacity available, the VSAN module may be unable to provision a new component with a certain workload to disk group 510 because the SSD capacity is almost unavailable for the component. VSAN module 114 remedies the imbalance by placing a workload from another virtual machine to disk group 510 that reduces the variance (e.g., one with high consumption of SSD operations, magnetic disk operations, and magnetic disk capacity) or migrating the workload from disk group 510 to another disk group reduce the variance in both.

Note that although each VSAN module 114 aims to balance resource workloads across all individual disks in the object store 116, VSAN module 114 does not aim for uniform resource consumption. Generally, VSAN module 114 chooses object placements or migrations that reduce variance in consumption to avoid running out of one resource type in a disk while still having an abundance of another resource type available.

Additionally, in a thin provisioning configuration, VSAN module 114 should ensure that sufficient headroom is available for potentially needed resources. For example, assume three virtual machines A, B, and C each have 100 GB each reserved on a 200 GB disk. While it is possible that A, B, and C might not all use the entire provisioned 100 GB simultaneously, VSAN module 114 may rebalance the workloads as the disk thickens (i.e., as the virtual machines use more of the resource capacity).

Figure 6:
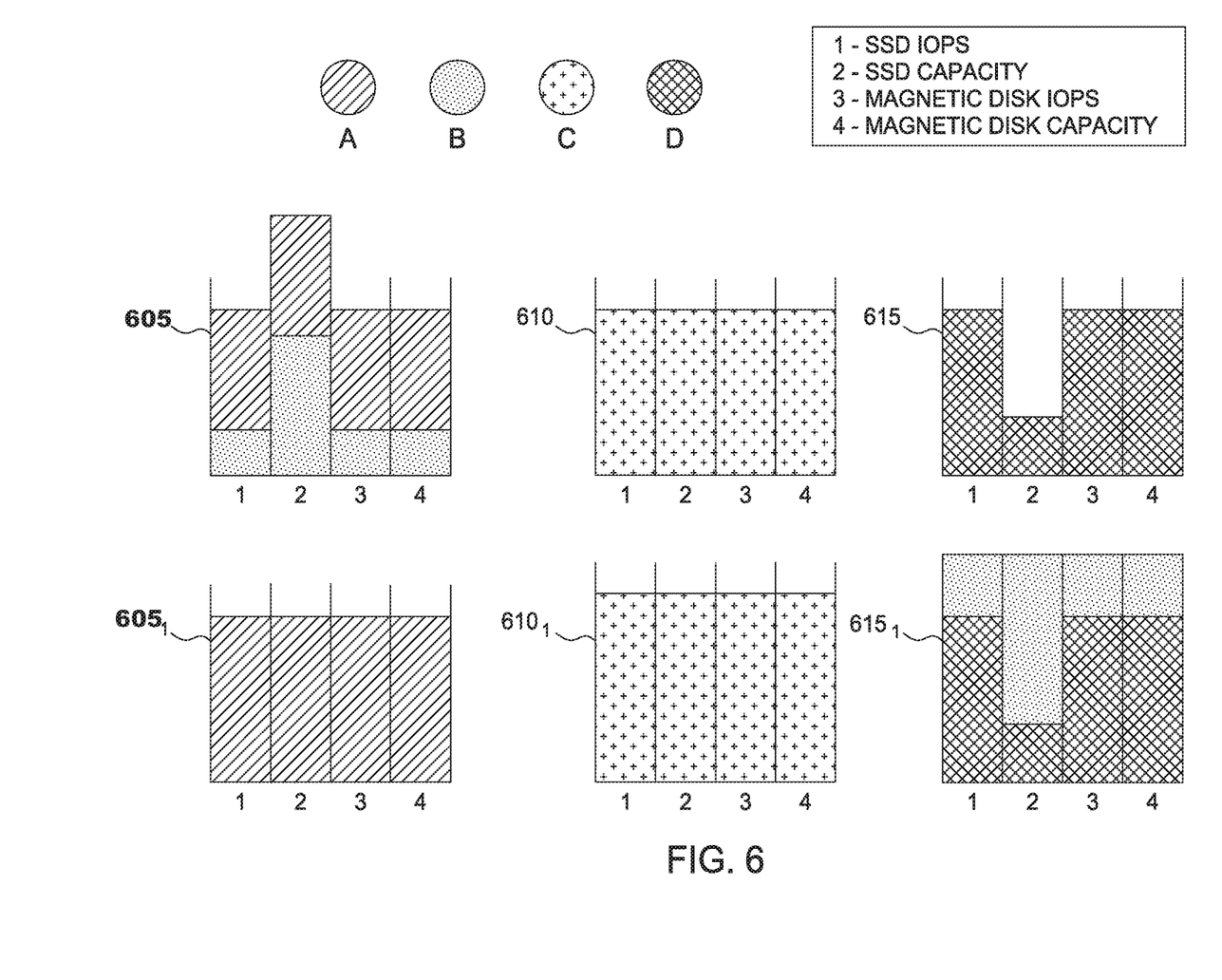
FIG. 6 illustrates an example specific-use case of migrating a workload in a disk group to another disk group, according to one embodiment.

FIG. 6 illustrates a specific-use case example of migrating a component object having an associated workload in a disk group to another disk group, according to one embodiment. During runtime, the VSAN module makes migration decisions to reduce high resource usage and bring an approximate balance across individual disks in the virtualization cluster. The VSAN module, in balancing resources, considers reserved resources and the actual usage of resources beyond reservations. In this example, assume that the virtualization cluster includes three disk groups. Of course, in practice, a VSAN may include many more disk groups. FIG. 6 depicts three disk groups 605, 610, and 615 at the upper portion of FIG. 6.

As shown, disk group 605 includes two workgroups A and B. Workgroup A depicts approximately an even amount of resource consumption across all types, while workgroup B depicts high usage in SSD capacity and low usage in the other resource types. The high usage in SSD capacity results in an imbalance. Disk group 610 includes a workload C that consumes a large amount of the resources relatively evenly. Disk group 615 includes a workload D that is consuming a large amount of SSD operations, magnetic disk operations, and magnetic disk capacity but consuming a small amount of SSD capacity. As a result, the variance between resource types in disk group 615 is high.

The resources in disk group 605 and 615 are not efficiently being used because of the high variance in consumption between the four resource types. Upon detecting imbalance among the resources, the VSAN module rebalances the resources so that the resources are more evenly distributed. Disk groups $605_1$, $610_1$, and $615_1$ illustrate disk groups 605, 610, and 615 after the rebalancing. As shown, workgroup B has been migrated from disk group 605 to disk group 615, resulting in disk group $615_1$. As a result, $605_1$, $610_1$, and $615_1$ represent more evenly balanced disk groups. The method for rebalancing is described in further detail in FIG. 8.

Figure 7:
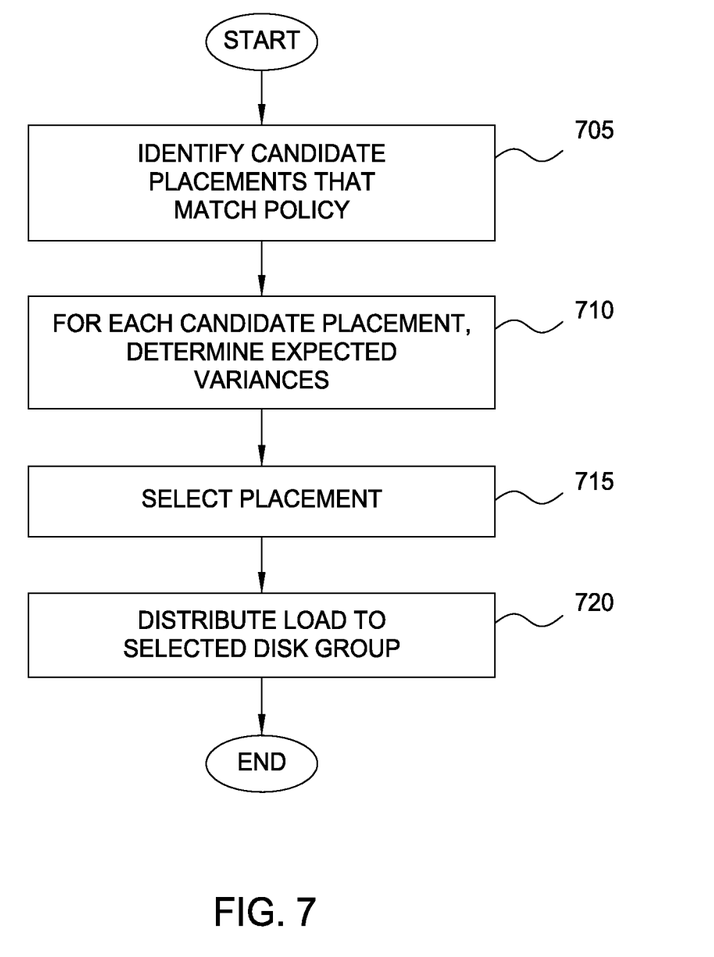
FIG. 7 illustrates a method for load balancing the component workloads of a virtual machine during creation, according to one embodiment.

FIG. 7 illustrates a method for load balancing resource usage across the cluster, according to one embodiment. As stated, CLOM sub-module 325 in each node 111 may translate a policy to a set of resource allocations that DOM sub-module 340 applies to local component objects via LSOM sub-module 350. An example policy might specify a set of requirements (e.g., operations, capacity, availability, reliability) as well as workload characterizations (e.g., expected cache-hit ratio, I/O request size) suited to a new virtual machine. In translating a particular policy to resource allocations, CLOM sub-module 325 decides on object placements in existing disk groups that reduce the variance in the disk groups.

The method begins at step 705, where CLOM sub-module 325 identifies candidate placements that match a policy. For example, assume that a local node in the virtualization cluster launches a new virtual machine. The virtual machine has storage requirements for 700 operations and 500 GB capacity. Accordingly, CLOM sub-module 325 identifies disk groups in component objects that are capable of satisfying the requirements. To do this, CLOM sub-module 325 consults the directory service in CMMDS sub-module 335 for objects that adhere to the requirements.

Once CLOM sub-module 325 has identified a set of candidate placements, then for each candidate placement, CLOM sub-module 325 determines expected variances that would result from the placement (at 710). This results in candidate placements having an increased or reduced variance. Thereafter, at step 715, CLOM sub-module 325 selects one of the candidates to place the new object. In one embodiment, CLOM sub-module 325 randomly selects the candidate placement to avoid placing components in the same disk group each time.

Figure 8:
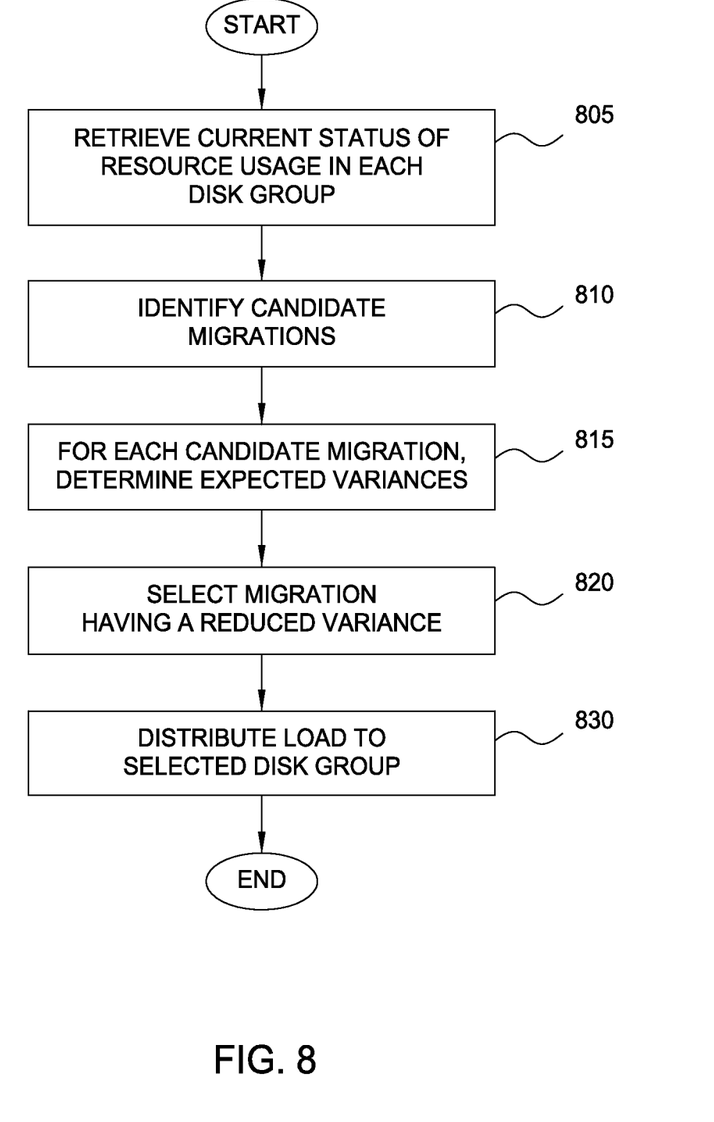
FIG. 8 illustrates a method for rebalancing workloads among disk groups, according to one embodiment.

FIG. 8 illustrates a method for rebalancing workloads among disk groups, according to one embodiment. It should be recognized that DOM sub-module 340 of each node 111 publishes, in parallel, the current consumption status of each local disk after retrieving such status from LSOM sub-module 350. The local VSAN module 114 of each node 111 monitors what has been provisioned to the storage clients and also monitors the amount of resources the storage clients are actually using. Occasionally, excessive imbalances may occur in a disk group. For example, a disk group that has a relatively low variance may nevertheless become imbalanced after a deletion. That is, a storage client may finish consuming a large amount of a resource type (e.g., reserved operations), leaving a large amount of that resource type available while still using other resource types. As another example, a previous placement or rebalancing may have unexpectedly led to a higher consumption variance.

At any rate, in the event of an excessive imbalance within a local disk group, CLOM sub-module 325 identifies a source component having an associated workload to migrate to another disk group. Using FIG. 6 as an example in rebalancing disk group 605, CLOM sub-module 325 may select workload B to migrate to another disk group. In step 805, CLOM sub-module 325 retrieves the current status of resource usage in each disk group. As stated, DOM sub-module 340 of every node 111 publishes aggregate capacity, reservation, and usage data for the SSD and magnetic disks. In step 810, CLOM sub-module 325 uses the published data to identify candidate migrations. In the continuing example, CLOM sub-module 325 may identify disk group 615 as a migration candidate because disk group 615 has available resources to handle component workload B whereas disk group 610 does not. Note that the migrations may be subject to constraints. For example, if disk group 605 was a RAID-1 mirror with another disk group, disk group 605 is unable to migrate the component having an associated workload B to that disk group.

In step 815, once CLOM sub-module 325 has identified candidate migrations, it then determines expected variances for each potential migration. CLOM sub-module 325 disregards candidate migrations that increase the variance in favor of migrations that decrease the variance. In step 820, CLOM sub-module 325 selects a migration to place the source workload. In one particular embodiment, CLOM sub-module 325 randomizes the selection to avoid other migrations to that disk group. In step 830, CLOM sub-module 325 assigns the component having the associated workload to the selected disk group.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. For example, although a number of foregoing described embodiments describe virtual machines as the clients that access the virtual disks provided by the VSAN module, it should be recognized that any clients, such as a cluster of non-virtualized host servers and/or non-virtualized applications running therein may similarly utilize the VSAN module in alternative embodiment. Similarly, alternative embodiments of the VSAN module may enable creation of high level storage objects other than virtual disks, such as, without limitation, REST objects, files, file systems, blob (binary large objects) and other objects. Similarly, while the load balancing techniques described in the foregoing embodiments related primarily to dealing with placing and/or rebalancing local storage disk groups, alternative embodiments may utilize similar techniques to rebalance memory, processing and/or networking resources. In such embodiments, DOM sub-module 340 may also monitor and publish resource usage in CPU, memory, and networking to other nodes in a distributed cluster. Similarly, while VSAN module 114 has been generally depicted as embedded in hypervisor 113, alternative embodiments may implement VSAN module separate from hypervisor 113, for example as a special virtual machine or virtual appliance, a separate application or any other "pluggable" module or driver that can be inserted into computing platform in order to provide and manage a distributed object store.

As described, embodiments described herein provide balancing the workloads of various resource types by the host. Advantageously, because each host computer rebalances local resources individually, this distributed approach does not require using a centralized algorithm or software for load balancing. Further, this approach ensures that storage clients are able to consume available resources efficiently throughout the distributed resources system and that individual disks do not run out of one or more resource types while an abundance of other resource types are available.

Generally speaking, the various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A computer-implemented method for placing a virtual disk component of a virtual disk in a distributed storage system having a plurality of physical computing devices, the method comprising:
retrieving a current usage of each physical storage device of each group of physical storage devices in a plurality of groups of physical storage devices, the plurality of groups of physical storage devices constituting a pool of groups of storage,
wherein each group of physical storage devices is housed in one of the plurality of physical computing devices and each physical computing device has a hypervisor running at least one virtual machine with a virtual disk, and
wherein the virtual disk is configured as a pair of mirrored virtual drives, each mirrored virtual drive has a plurality of virtual disk components that are virtual stripes of the mirrored virtual drive, each virtual disk component of the virtual disk is mappable to any one of the groups in the pool of storage, and each virtual disk component to be placed has an associated workload that affects usages of physical storage devices;
identifying candidate groups of physical storage devices among the plurality of groups of physical storage devices based on the current usage of each physical storage device, wherein each candidate group of physical storage devices has a current variance of the current usages of its physical storage devices;

for each candidate group of physical storage devices, determining an expected increased or reduced variance of usage that would result if one of the virtual disk components of the virtual disk with its associated workload were mapped to the candidate group of physical storage devices; and mapping the one virtual disk component of the virtual disk to one of the candidate groups of physical storage devices having an expected reduced variance over the current variance.

2. The computer-implemented method of claim 1, wherein the distributed storage system is a software-defined storage area network.

3. The computer-implemented method of claim 2, wherein each physical computing device publishes the current usages to other physical computing devices in the software-defined storage area network.

4. The computer-implemented method of claim 1, wherein the one of at least one candidate group of physical storage devices with the expected reduced variance is selected at random.

5. The computer-implemented method of claim 1, further comprising, publishing the usage of the candidate group of physical storage devices to which the virtual disk component of the virtual disk is mapped.

6. The computer-implemented method of claim 1, wherein identifying the candidate groups of physical storage devices comprises:

measuring usage caused by the workload for each physical storage device in the group of physical storage devices; and determining the candidate group of physical storage devices capable of handling the associated workload based on the measurements of each of the groups of physical storage devices.

7. A non-transitory computer-readable storage medium storing instructions, which, when executed on a processor, performs an operation for placing a virtual disk component of a virtual disk in a distributed storage system having a plurality of physical computing devices, the operation comprising:

retrieving current usage of each physical storage device of each group of physical storage devices in a plurality of groups of physical storage devices, the plurality of groups of physical storage devices constituting a pool of groups of storage, wherein each group of physical storage devices is housed in one physical computing device of the plurality of physical computing devices and each physical computing device has a hypervisor running at least one virtual machine with a virtual disk; and wherein the virtual disk is configured as a pair of mirrored virtual drives, each mirrored virtual drive comprising a plurality of virtual disk components that are virtual stripes of the mirrored virtual drive, each virtual disk component of the virtual disk is mappable to any one of the groups of physical storage devices in the physical computing devices of the distributed storage system, each virtual disk component to be placed having an associated workload that affects usages of physical storage devices;

identifying candidate groups of physical storage devices among the plurality of groups of physical storage devices based on the current usage of each physical storage device, wherein each candidate group of physical storage devices has a current variance of the current usages of its physical storage devices;

for each candidate group of physical storage devices, determining an expected increased or reduced variance of usage that would result if one of the virtual disk components of the virtual disk with its associated workload were mapped to the candidate group of physical storage devices; and mapping the one virtual disk component of the virtual disk to one of the candidate groups of physical storage devices having an expected reduced variance over the current variance.

8. The computer-readable storage medium of claim 7, wherein the distributed storage system is a software-defined storage area network.

9. The computer-readable storage medium of claim 8, wherein each physical computing device publishes the usage to other physical computing devices in the software-defined storage area network.

10. The computer-readable storage medium of claim 7, wherein the one of at least one candidate group of physical storage devices with the expected reduced variance is selected at random.

11. The computer-readable storage medium of claim 7, wherein the operation further comprises publishing to each physical computing device the usage of the candidate group of physical storage devices to which the virtual disk component of the virtual disk is mapped.

12. The computer-readable storage medium of claim 7, wherein identifying the candidate groups of physical storage devices comprises:

measuring usage caused by the workload for each type of physical storage device in the group of physical storage devices; and determining the candidate groups of physical storage devices capable of handling the associated workload based on the measurements of each of the groups of physical storage devices.

13. A system comprising:

a processor and a memory hosting an application, which, when executed on the processor, performs an operation for placing a virtual disk component of a virtual disk in a distributed storage system having a plurality of physical computing devices, the operation comprising:

retrieving current usage of each physical storage device of each group of physical storage devices in a plurality of groups of physical storage devices, the plurality of groups of physical storage devices constituting a pool of groups of storage, wherein each group of physical storage devices is housed in one physical computing device of the plurality of physical computing devices and each physical computing device has a hypervisor running at least one virtual machine with a virtual disk, and wherein the virtual disk is configured as a pair of mirrored virtual drives, each mirrored virtual drive comprising a plurality of virtual disk components that are virtual stripes of the mirrored virtual drive, each virtual disk component of the virtual disk is mappable to any one of the groups in the pool of storage, each virtual disk component to be placed having an associated workload that affects usages of physical storage devices;

identifying candidate groups of physical storage devices among the plurality of groups of physical storage devices based on the current usage of each physical storage device, wherein each candidate group of physical storage devices has a current variance of the current usages of its physical storage devices;

for each candidate group of physical storage devices, determining an expected increased or reduced variance of the usage that would result if one of the virtual disk components of the virtual disk with its associated workload were mapped to the candidate group of physical storage devices; and mapping the one virtual disk component of the virtual disk to one of the candidate groups of physical storage devices having an expected reduced variance over the current variance.

14. The system of claim 13, wherein the distributed storage system is a software-defined storage area network.

15. The system of claim 13, wherein the one of at least one candidate group of physical storage devices with the expected reduced variance is selected at random.

16. The system of claim 13, wherein the operation further comprises publishing the usage of the candidate group of physical storage devices to which the virtual disk component of the virtual disk is mapped.

17. The system of claim 13, wherein identifying the candidate groups of physical storage devices comprises:

measuring usage caused by the workload for each physical storage device in the group of physical storage devices; and determining the candidate group of physical storage devices capable of handling the associated workload based on the measurements of each of the groups of physical storage devices.

18. A computer-implemented method for rebalancing a set of virtual disk components in a distributed storage system having a plurality of physical computing devices, the method comprising:

retrieving current usage of each physical storage device of each group of physical storage devices in a plurality of groups of physical storage devices, the plurality of groups of physical storage devices constituting a pool of groups of storage, wherein each group of physical storage devices is housed in one physical computing device of the plurality of physical computing devices and each physical computing device has a hypervisor running at least one virtual machine with a virtual disk;

identifying a virtual disk component of a virtual disk having an associated workload that affects usages of physical storage devices, wherein the associated workload causes a large variance among current usage of each physical device in a first one of the groups of physical storage devices, and wherein the virtual disk is configured as a pair of mirrored virtual drives, each mirrored virtual drive comprising a plurality of virtual disk components that are virtual stripes of the mirrored virtual drive, each virtual disk component of the virtual disk is mappable to any one of the groups in the pool of storage;

identifying candidate groups of physical storage devices among the plurality of groups of physical storage devices based on the current usage of each physical storage device, wherein each candidate group of physical storage devices has a current variance of the current usages of its physical storage devices;

for each candidate group of physical storage devices, determining an expected increased or reduced variance of the usage that would result if the virtual disk component of the virtual disk with its associated workload were mapped to the candidate group of physical storage devices; and remapping the virtual disk component of the virtual disk to one of the candidate groups of physical storage devices having an expected reduced variance over the current variance.

19. The computer-implemented method of claim 18, wherein the distributed storage system is a software-defined storage area network.

20. The computer-implemented method of claim 18, wherein each physical computing device publishes the usage to other physical computing devices in the software-defined storage area network.

* * * * *